US012661608B2

(12) United States Patent

Thies et al.

(10) Patent No.: US 12,661,608 B2
(45) Date of Patent: Jun. 23, 2026

(54) PARTICLE REMOVAL DEVICE AND METHOD FOR WET CLEANING OF A PARTICLE REMOVAL DEVICE

(71) Applicant: Glatt Gesellschaft mit beschränkter Haftung, Binzen (DE)

(72) Inventors: Jochen Thies, Lörrach (DE); Dirk Zimmermann, Wehr (DE)

(73) Assignee: Glatt Gesellschaft mit beschränkter Haftung, Binzen (DE)

( * ) Notice: Subject to any disclaimer, the term of this patent is extended or adjusted under 35 U.S.C. 154(b) by 0 days.

(21) Appl. No.: 19/104,060

(22) PCT Filed: Aug. 15, 2023

(86) PCT No.: PCT/EP2023/072475

§ 371 (c)(1),
(2) Date: Feb. 14, 2025

(87) PCT Pub. No.: WO2024/038058

PCT Pub. Date: Feb. 22, 2024

(65) Prior Publication Data

US 2026/0007993 A1      Jan. 8, 2026

(30) Foreign Application Priority Data

Aug. 17, 2022     (DE) ..................... 10 2022 120 740.4

(51) Int. Cl.
B01D 53/02        (2006.01)
B01D 46/10        (2006.01)
B01D 46/71        (2022.01)

(52) U.S. Cl.
CPC ............. B01D 46/10 (2013.01); B01D 46/71 (2022.01)

(58) Field of Classification Search
CPC ......... B01D 46/10; B01D 46/71; B01D 46/79
See application file for complete search history.

(56) References Cited

U.S. PATENT DOCUMENTS

| | | | | |
|---|---|---|---|---|
| 3,816,978 | A | * | 6/1974 | O'Dell ................... B01D 46/71 95/280 |
| 4,081,255 | A | * | 3/1978 | Evans .................... B01D 46/79 110/119 |

(Continued)

FOREIGN PATENT DOCUMENTS

| | | |
|---|---|---|
| EP | 2527025 A1 | 5/2012 |
| JP | S58155397 A | 9/1983 |

(Continued)

*Primary Examiner* — Christopher P Jones
(74) *Attorney, Agent, or Firm* — The Webb Law Firm

(57) ABSTRACT

A particle removal device for removing particles from a process gas stream, and a method for wet cleaning of the particle removal device. The particle removal device includes a housing comprising a vertically oriented longitudinal axis, a filter subdividing the housing into a process chamber and a clean gas chamber, and a clean gas chamber cleaning device arranged in the clean gas chamber and having at least one clean gas chamber cleaning nozzle for wet cleaning of the filter. The clean gas chamber cleaning nozzle includes a filter plane inclined with respect to the longitudinal axis during the cleaning process and includes a bypass device through which a bypass channel passes. The bypass device includes a bypass channel gate valve that can be selectively positioned in a closed position preventing fluid flow through the bypass channel or in at least one open position allowing fluid flow.

17 Claims, 5 Drawing Sheets

(56)                    References Cited

U.S. PATENT DOCUMENTS

| | | | | |
|---|---|---|---|---|
| 4,465,497 A * | 8/1984 | Howeth | ................ | B01D 46/71 |
| | | | | 406/137 |
| 5,358,552 A | 10/1994 | Seibert et al. | | |
| 7,614,396 B2 | 11/2009 | So | | |
| 2020/0172251 A1 * | 6/2020 | Beckman | ............... | B01D 46/72 |

FOREIGN PATENT DOCUMENTS

| | | | |
|---|---|---|---|
| JP | S63126015 | U | 8/1988 |
| JP | H3288508 | A | 12/1991 |
| JP | H7328379 | A | 12/1995 |
| WO | 2004016988 | A1 | 12/2004 |

* cited by examiner

PARTICLE REMOVAL DEVICE AND METHOD FOR WET CLEANING OF A PARTICLE REMOVAL DEVICE

CROSS-REFERENCE TO RELATED APPLICATIONS

This application is the United States national phase of International Patent Application No. PCT/EP2023/072475 filed Aug. 15, 2023, and claims priority to German Patent Application No. 10 2022 120 740.4 filed Aug. 17, 2022, the disclosures of which are hereby incorporated by reference in their entireties.

BACKGROUND

Field

The invention relates to a particle removal device for separating particles from a process gas flow, with a housing comprising a vertically oriented longitudinal axis, with a filter subdividing the housing into a process chamber comprising the particles to be separated and a clean gas chamber receiving the dedusted process gas, with a particle inlet arranged on the process chamber and a particle discharge arranged on the process chamber, and with a clean gas outlet arranged in the clean gas chamber.

Furthermore, the invention relates to a method for wet-cleaning a particle removal device for separating particles from a process gas flow, with a housing comprising a vertically oriented longitudinal axis, with a filter subdividing the housing into a process chamber comprising the particles to be separated and a clean gas chamber receiving the dedusted process gas, with a particle inlet arranged on the process chamber and a particle discharge arranged on the process chamber, and with a clean gas outlet arranged in the clean gas chamber.

Description of Related Art

In a prior art not disclosed in writing, a particle removal device comprises a filter that can be removed for cleaning. For this purpose, the particle removal device is expediently arranged on a lifting column that is suitable for lowering the particle removal device to a comfortable operating height for removing the filter.

SUMMARY

The object of the invention is therefore to provide a particle removal device and method that allows cleaning in place without removing the filter.

In a particle removal device of the type mentioned above, this objective is achieved by that the particle removal device comprises a clean gas chamber cleaning device arranged in the clean gas chamber and having at least one clean gas chamber cleaning nozzle for wet cleaning of the filter, which comprises a filter plane inclined with respect to the longitudinal axis, during the cleaning process and comprises a bypass device through which a bypass channel passes, wherein the bypass channel comprises a bypass inlet connected to the clean gas chamber and a bypass outlet connected to the process chamber, wherein the bypass device further comprises a bypass channel gate valve that can be selectively positioned in a closed position preventing fluid flow through the bypass channel or in at least one open position allowing fluid flow. Advantageously, this embodiment of the particle removal device enables CIP cleaning of the particle removal device. This also eliminates the need for a costly lifting column for the particle removal device.

A cleaning operation is an operation of the particle removal device in which the filter is cleaned of particles by means of at least one cleaning device arranged in the particle removal device when the filter is not being subjected to filtration. The process that takes place during the cleaning operation is referred to as a wet cleaning process.

Wet cleaning refers to a cleaning of the filter with a cleaning fluid in the form of a liquid, such as water in particular, during the cleaning operation.

The drying process is the process that dries the filter after the wet cleaning process.

In contrast to the cleaning operation, an operation in which the particles introduced into the particle removal device by means of the process gas are separated from the process gas flow by the filter is referred to as a process operation.

Dry cleaning refers to a cleaning of the filter with a gas, in particular air, during the process operation.

In addition to the advantageous embodiment of the particle removal device the bypass device comprises a gate valve drive unit associated with the bypass channel gate valve, which brings the bypass channel gate valve from the closed position into an open position and vice versa. This results in further automation of the particle removal device.

Furthermore, it is advantageous that a process chamber cleaning device comprising at least one process chamber cleaning nozzle is arranged in the process chamber, wherein it is expediently possible to move the at least one process chamber cleaning nozzle radially from the longitudinal axis in the direction of a housing wall and in the opposite direction. This further improvement of the particle removal device ensures that not only the clean gas chamber can be automatically cleaned by means of the clean gas chamber cleaning device, but also the process gas chamber by means of the process gas chamber cleaning device. This makes it possible to clean not only the filter top located in the clean gas chamber but also the filter bottom located in the process chamber, thus cleaning the filter of particles that clog the filter.

According to a further preferred embodiment of the particle removal device the particle discharge is arranged in the area of a housing floor. The arrangement of the particle discharge at the housing floor favors, on the one hand, the emptying of the particle removal device and, on the other hand, the cleaning fluid, expediently in the form of a cleaning liquid, is discharged by the particle discharge from the particle removal device by means of gravity.

According to an additional advantageous improvement of the particle removal device the filter is connected at its peripheral area to an inner surface of the housing wall, so that a cleaning fluid collection area is formed in the peripheral area on the housing wall, which is connected to the bypass inlet, wherein the cleaning fluid collection area expediently comprises a lowest point and the bypass inlet is connected to the cleaning fluid collection area at the lowest point of the latter. Due to the filter comprising a filter plane inclined with respect to the longitudinal axis—i.e. the normal vector to the filter plane forms an angle with the longitudinal axis—a cleaning fluid collection area comprising a lowest point forms in the peripheral area of the filter adjacent to the inner surface of the housing wall of the device. During a wet cleaning process performed in the cleaning operation with interrupted filtration, the clean gas chamber cleaning device, which is arranged in the clean gas chamber and expediently comprises at least one clean gas chamber cleaning nozzle, sprays a cleaning fluid, which is in the form of a cleaning liquid, for wet cleaning, which cleans the filter and then runs off over a filter top facing the clean gas chamber. The cleaning liquid then collects at the lowest point of the cleaning fluid collection area, where the cleaning liquid can flow through the bypass device via the bypass inlet and the adjoining bypass channel and obtain into the process chamber. Thus, such an embodiment of the particle removal device ensures that the particle removal device is CIP-cleanable.

The particle removal device preferably comprises a conveying device arranged downstream of the clean gas outlet for the variable setting of the process gas flow. The conveying device can be used to variably set the process gas flow, which, in addition to treating the granules in the treatment apparatus, also expediently conveys the particles from a treatment apparatus, in particular a fluidizing apparatus, to the particle removal device. In this regard, the conveying device comprises a control unit and a conveying unit. To set the process gas flow, settings can either be made by a conveying unit expediently in the form of a blower or by a control unit expediently comprising closed-loop control functionality. The control unit is preferably realized in the form of a control valve comprising a control unit drive device or as a control flap comprising a control unit drive device. On the one hand, this allows fluctuations in the blower to be compensated when it comes to conveying the process gas flow, while on the other hand, the control unit, which is in the form of a control valve or control flap, makes it possible to set the process gas flow by adjusting the passage area and thus the pressure loss that occurs.

After a further advantageous improvement of the particle removal device the particle removal device comprises a dry-cleaning device which is suitable for cleaning the filter during process operation. This allows the filter to be cleaned easily and effectively when a high pressure drop is detected across the filter during process operation. Whether the filter is already clogged with particles can be determined, for example, by measuring the pressure difference between the process chamber and the clean gas chamber, whereby the particle removal device comprises a measuring device that is suitable for detecting a pressure difference. Other measuring methods are conceivable.

In conclusion, the particle removal device comprises a control device expediently comprising a closed loop control functionality, which is particularly suitable for controlling and/or regulating the particle removal device. In particular, the control device is configured to control and/or regulate the conveying device and/or the gate valve drive unit and/or the control unit drive device and/or the dry cleaning drive device and/or the clean gas chamber cleaning device and/or the process chamber cleaning device. Advantageously, a fully automated operation is possible.

Furthermore, the objective in a method of the type mentioned at the beginning is achieved by the fact that the particle removal device comprises a clean gas chamber cleaning device arranged in the clean gas chamber and having at least one clean gas chamber cleaning nozzle for wet cleaning of the filter, which comprises a filter plane inclined with respect to the longitudinal axis, during the cleaning process and comprises a bypass device through which a bypass channel passes, wherein the bypass channel comprises a bypass inlet connected to the clean gas chamber and a bypass outlet connected to the process chamber, wherein the bypass device further comprises a bypass channel gate valve that can be selectively positioned in a closed position preventing fluid flow through the bypass channel or in at least one open position allowing fluid flow, wherein, in the cleaning operation, the clean gas chamber cleaning device outputs a cleaning fluid in the form of a cleaning liquid and the bypass channel gate valve is moved from a closed position into an open position so that the cleaning fluid can flow at least partially through the bypass channel from the clean gas chamber into the process gas chamber. This method also has the advantage of enabling CIP cleaning of the particle removal device, which means that significant investment costs, for example for a cost-intensive lifting column, can be saved.

After a corresponding advantageous further improvement of the method the bypass channel gate valve is moved from the closing position into the opening position before, during or after the cleaning fluid is output. Advantageously, after opening the bypass channel gate valve, the cleaning fluid in the form of a cleaning liquid can then flow through the bypass device via the bypass inlet and the adjoining bypass channel and into the process chamber, from where it can then be discharged through the particle discharge, for example.

According to an additional advantageous embodiment of the method the cleaning fluid is discharged from the process chamber via the particle discharge. This enables easy discharge of the cleaning liquid used for cleaning.

Furthermore, after the wet cleaning, the filter is dried by an unloaded process gas flowing through the particle removal device, wherein at least at the beginning of the drying process, the bypass channel gate valve remains in an opening position so that the unloaded process gas can at least partially flow through the bypass device.

The method as described herein, characterized in that, as the drying process progresses, the bypass channel gate valve is gradually closed. According to a particularly advantageous further improvement of the method the unloaded process gas is heated before flowing through the particle removal device, so that the cleaning fluid retained in the filter after the wet cleaning evaporates or vaporizes. After wet cleaning, a large number of the filter's openings are clogged with cleaning fluid, causing the filter to generate a very high pressure drop. For this reason, the bypass channel gate valve remains open or is opened to allow the unloaded process gas to flow through the process chamber past the filter into the clean gas chamber. As the drying process progresses, the bypass channel gate valve can be gradually closed so that a larger portion of the unloaded process gas is forced to flow through the filter. This means that the bypass channel gate valve is moved from the original open position to a opening position that is more effective at preventing the passage of fluid. This significantly shortens the drying process. The heated process gas also heats the filter, causing the cleaning fluid that clogged the filter after wet cleaning to evaporate or vaporize. Once the cleaning fluid has evaporated or vaporized and the filter has dried, the drying process can be stopped.

BRIEF DESCRIPTION OF THE DRAWINGS

The terms Fig., Figs., Figure, and Figures are used interchangeably in the specification to refer to the corresponding figures in the drawings.

The invention is explained in more detail below, with reference to the accompanying drawings, in which.

5

Figure 2:
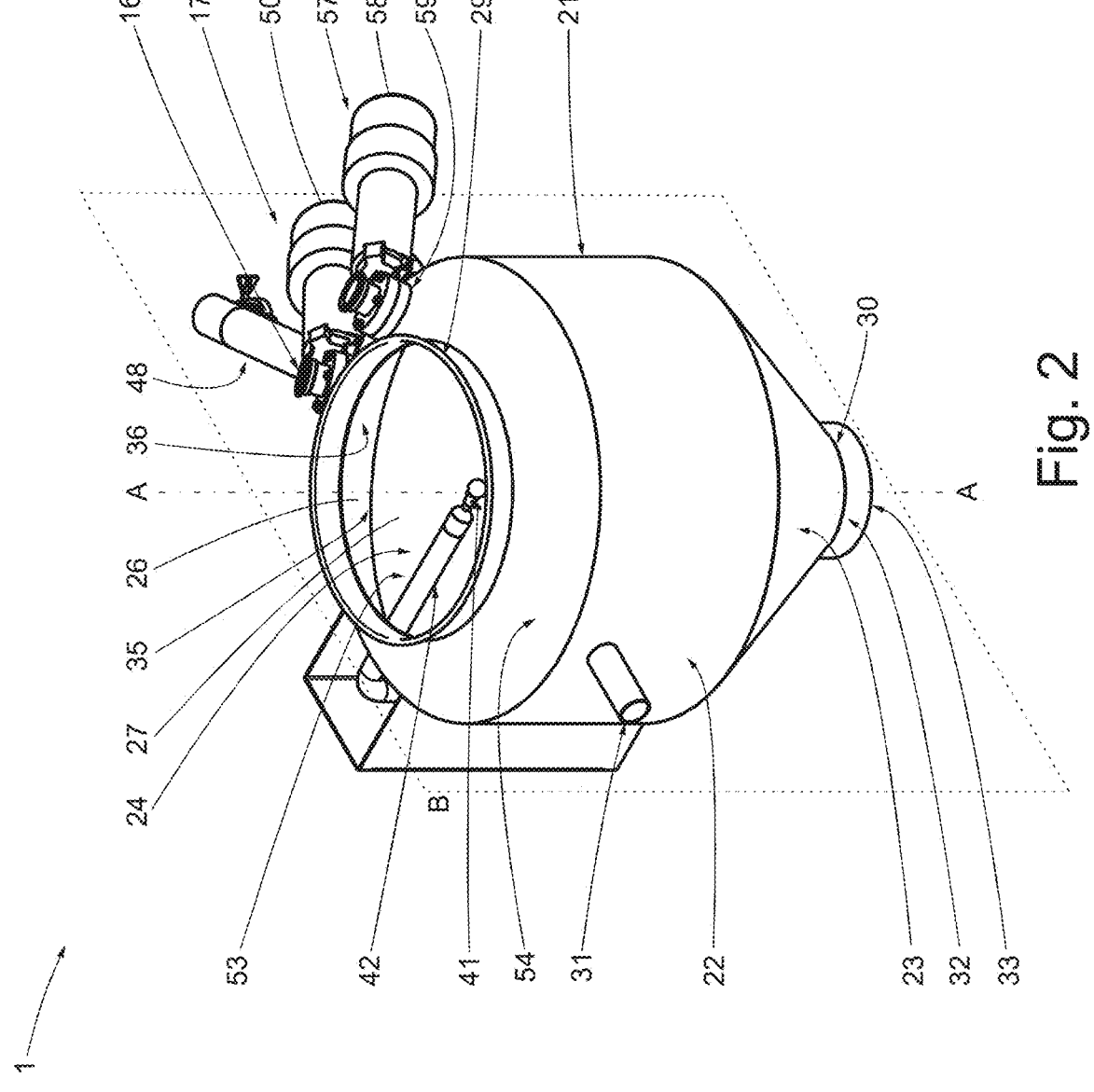
Figure 3:
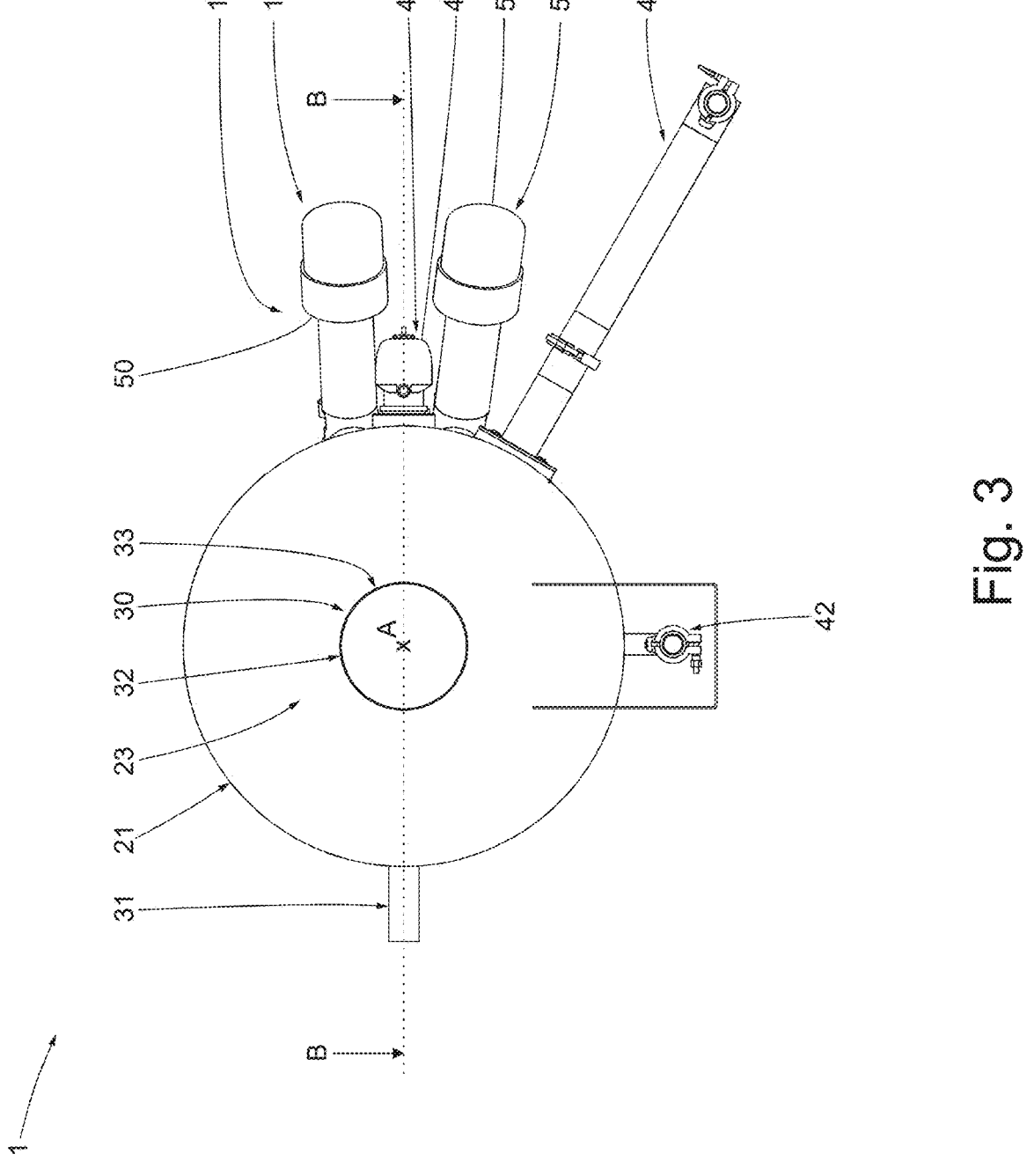
Figure 4:
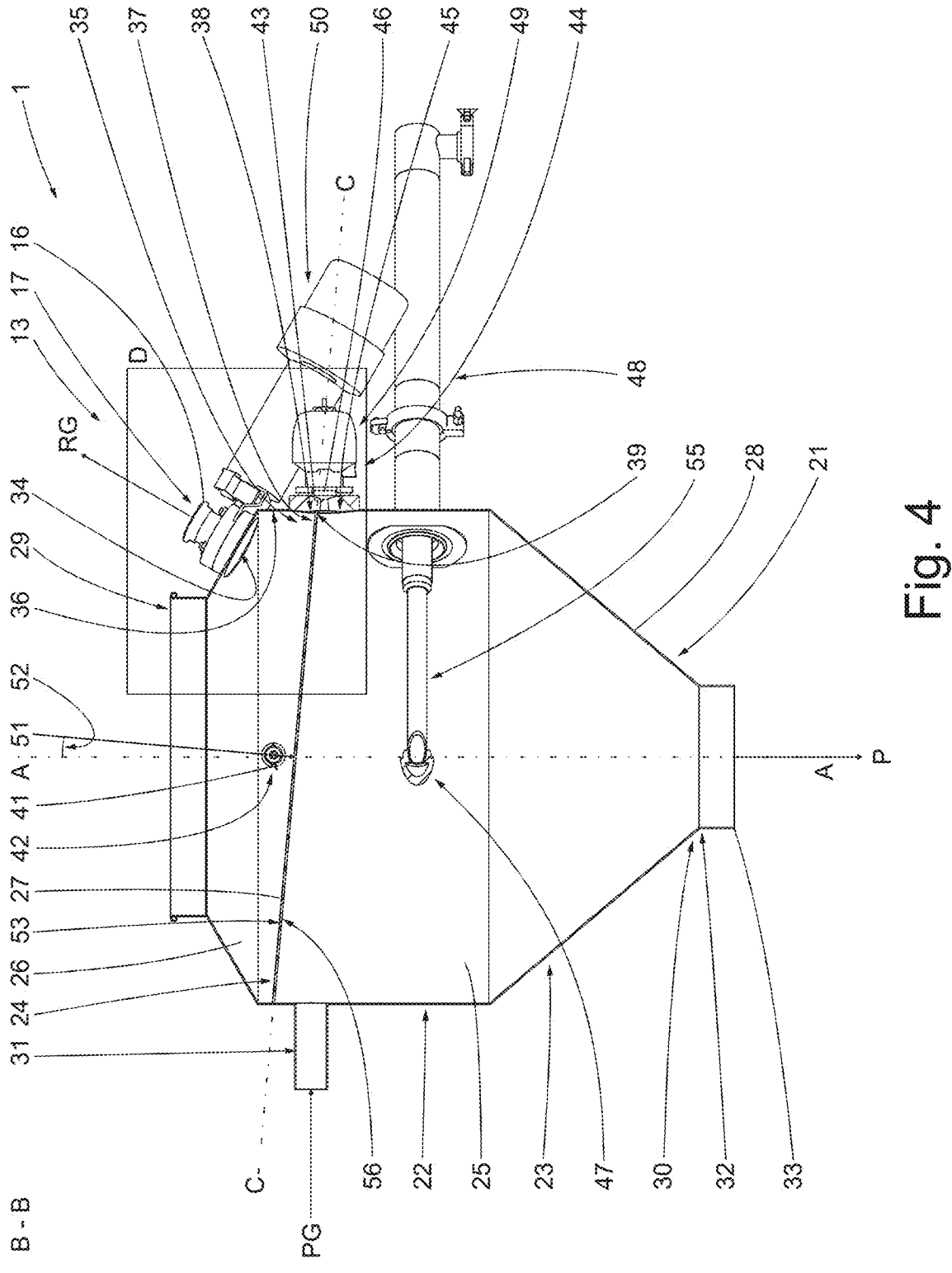
Figure 5:
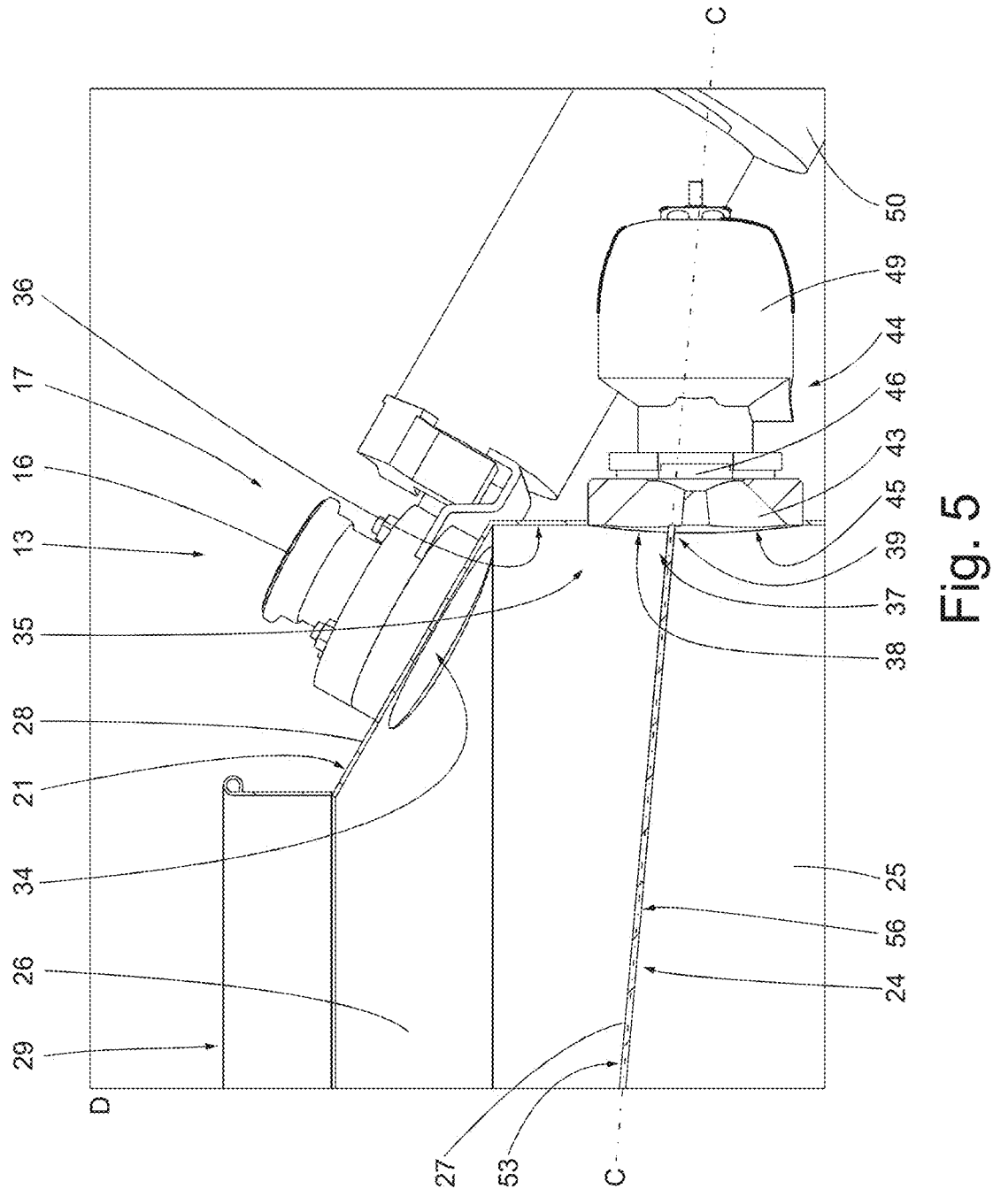

FIG. 2 shows a perspective view of the particle removal device,

FIG. 3 shows a bottom view of the particle removal device,

FIG. 4 shows a sectional view of the particle removal device through a sectional plane B-B as shown in FIG. 3, and FIG. 5 shows an enlarged view of the detailed section D of the particle removal device shown in FIG. 4.

DETAILED DESCRIPTION

The following description refers to the embodiment of a preferred particle removal device 1 illustrated in the drawing, unless otherwise stated.

Figure 1:
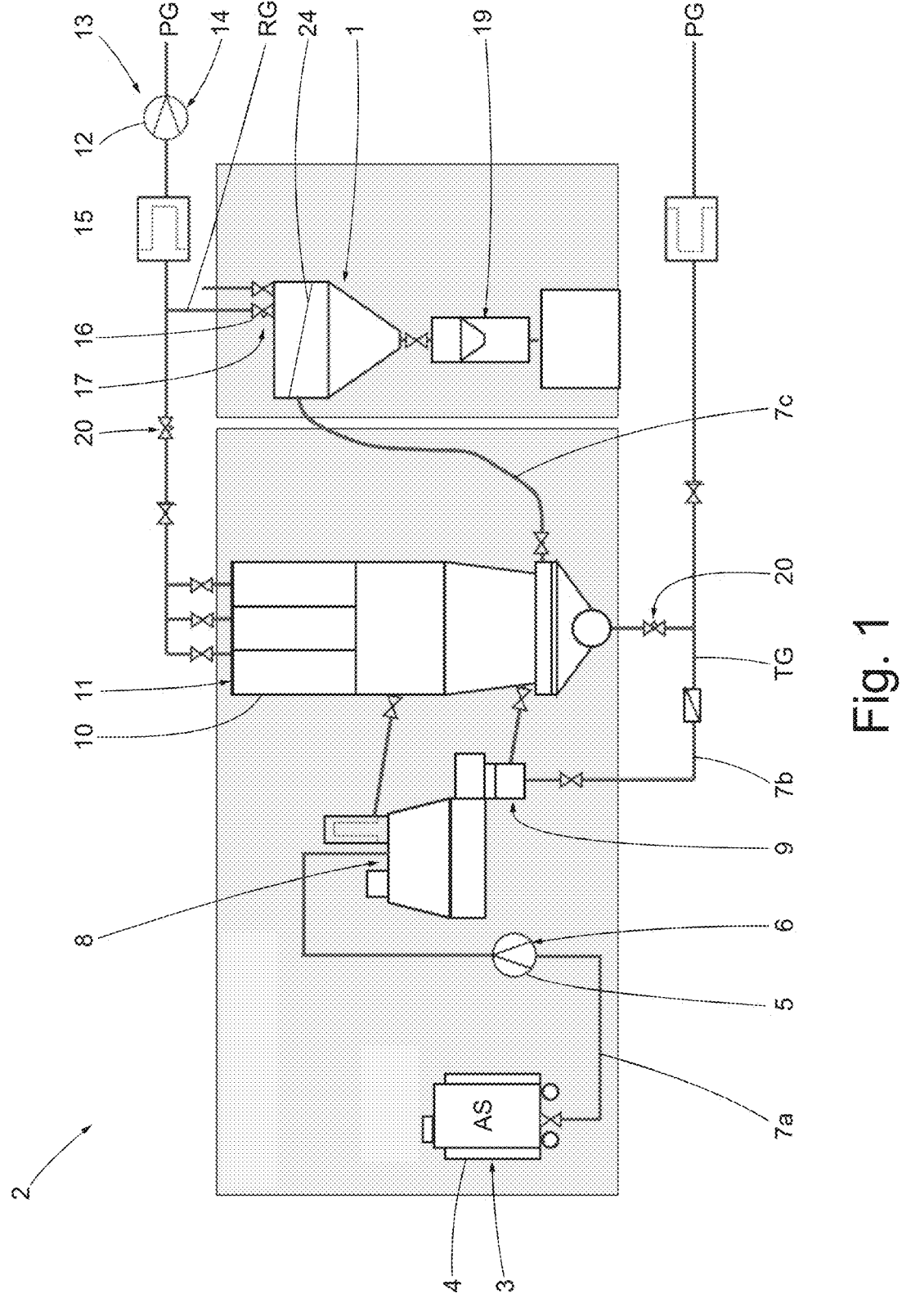
FIG. 1 shows a process flow diagram of a granule manufacturing device comprising a particle removal device.

FIG. 1 shows a process flow diagram of a granule manufacturing device 2 comprising a particle removal device 1, in particular for manufacturing granules referred to as particles P for the pharmaceutical industry.

The exemplarily represented granule manufacturing device 2 comprises a feed container 3 for the raw materials AS, which is formed as a mobile suspension reservoir 4. The feed container 3 is connected to a granulator 8 via a first feeding line 7*a* comprising a conveying device 6 in the form of a pump 5. Granules are produced from the raw materials AS in the granulator 8. In an embodiment not shown, the raw materials AS are conveyed separately into the granulator 8.

The granules produced in the granulator 8 are screened in a screening device 9 connected to the granulator 8 and then conveyed by means of a second feeding line 7*b*, through which a process gas PG flows, designed as a transfer gas TG, into a fluidizing apparatus 11 in the form of a fluidized-bed dryer 10. In the fluidizing apparatus 11, the screened granules are further treated, in particular dried, in a fluidized state using process gas PG. In order to generate the fluidization in the fluidizing apparatus 11, the granule manufacturing device 2 comprises a conveying device 13 that generates a process gas flow and is designed as a conveying unit 14. The conveying unit 14 is expediently designed as a blower 12 or as a fan.

After their treatment in the fluidizing apparatus 11, the treated granules, which are then referred to as particles P, are also conveyed by means of the conveying device 13 through a third feeding line 7*c* from the process gas PG into the particle removal device 1. For the variable setting of the process gas flow, the conveying device 13 comprises, in addition to the conveying unit 12 with an upstream filtering device 15, a control unit 17 designed as a control valve 16.

The particles P conveyed by the process gas PG into the particle removal device 1 are separated from the process gas flow at a filter 24, the particles P being collected in a collection container 19 and the cleaned process gas PG, referred to as the clean gas RG, being conveyed by the conveying device 13 out of the granule manufacturing device 2, for example into the environment. The process gas flow can also be variably set in the granulation production device 2 using corresponding control or metering valves 20.

Due to the arrangement of the conveying device 13 downstream of the fluidizing apparatus 11 and downstream of the particle removal device 1, a vacuum prevails in the granule manufacturing device 2. The vacuum is expediently between 50 mbar and 500 mbar, but preferably about 100 mbar.

FIG. 2 shows in perspective the particle removal device 1 for separating particles P from the process gas flow.

The particle removal device 1 comprises a housing 21 with a vertically oriented longitudinal axis A-A. The housing 21, which comprises a housing wall 28, in the embodiment shown comprises a housing cover 54, a cylindrical housing portion 22, a conical housing portion 23 and a housing floor 30.

In the embodiment shown, a filter 24 is arranged in the cylindrical housing portion 22, which subdivides the housing 21 into a process chamber 25 for receiving the particles P separated from the process gas flow and a clean gas chamber 26 for receiving the dedusted process gas PG. In this case, the process gas chamber 25 extends over the conical housing portion 23 and partially over the cylindrical housing portion 22. The clean gas chamber 26, on the other hand, extends exclusively over the cylindrical housing portion 22.

In the embodiment shown, the filter 24 is designed as a metal filter 27 and is arranged in an inclined filter plane C-C with respect to the longitudinal axis A-A, i.e. the normal vector 51 to the filter plane C-C comprises an angle 52 with the longitudinal axis A-A. The angle 52 preferably has an angular dimension of 1° to 20°, in particular 3° to 10°. In an embodiment not shown, the filter 24 is realized as a textile filter. Furthermore, the filter 24 is connected at its peripheral area 35 to an inner surface 36 of the housing wall 28 of the device. In the peripheral area 35, a cleaning fluid collection area 37 forms on the inner surface 36 of the housing wall 28, which is connected to the bypass inlet 38, wherein, as is expedient, as in the illustrated embodiment, the cleaning fluid collection area 37 comprises a lowest point 39 and a bypass 38 communicates with the cleaning fluid collection area 37 at the lowest point 39.

The particle removal device 1 also comprises a bypass device 44 with a bypass channel 43 passing through it, wherein the bypass channel 43 has a bypass inlet 38 connected to the clean gas chamber 26 and a bypass outlet 45 connected to the process chamber 25. The bypass device 44 further comprises a bypass channel gate valve 46 that can be selectively positioned in a closing position preventing fluid from passing through the bypass channel 44 or in at least one opening position allowing fluid to pass through. In order to move the bypass channel gate valve 46 optionally from the closing position to an opening position and vice versa, the bypass device 44 expediently comprises a gate valve drive unit 49 associated with the bypass channel gate valve 46.

Furthermore, the particle removal device 1 comprises a clean gas chamber cleaning device 42, which is arranged in the clean gas chamber 26 and has at least one clean gas chamber cleaning nozzle 41, for wet cleaning the filter 24, which has a filter plane C-C inclined with respect to the longitudinal axis A-A, i.e. the normal vector 51 on the filter plane C-C forms an angle 52 to the longitudinal axis A-A. The angle 52 preferably has an angular dimension of 1° to 20°, in particular 3° to 10°. This allows the cleaning fluid, in the form of a cleaning liquid, to flow effectively in the cleaning operation on a filter top side 53 in the direction of the cleaning fluid collection area 37, and then to flow out through the bypass channel 44 from the clean gas chamber 26 into the process chamber 25.

A process chamber cleaning device 48 comprising at least one process chamber cleaning nozzle 47 is arranged in the process chamber 25, as can be seen in a sectional view of the particle removal device 1 through a sectional plane B-B shown in FIG. 3. In the embodiment shown, the process chamber cleaning device 48 is designed as a cleaning lance 55, so that the at least one process chamber cleaning nozzle 47 can be moved radially away from the longitudinal axis A-A in the direction of a housing wall 28 and in the opposite direction. This makes it possible to move the process chamber cleaning device 48 out of the process chamber 25 in the direction of a housing wall 28 during process operation, and to countersink a process chamber cleaning device head, which is not shown, in the housing wall 28 so that it is flush with the latter, in order not to hinder the separation of particles from the process gas during process operation. In addition, a fluid, expediently process gas PG, always flows through the process chamber cleaning device 48 during the process operation of the particle removal device 1, in order to prevent the at least one process chamber cleaning nozzle 47 from becoming clogged with particles P. In cleaning operation, the process chamber cleaning device 48 is extended in the process chamber 25 in the direction of the longitudinal axis A-A, in order to clean the filter 24 on its filter bottom side 56 from adhering particles P.

In the cylindrical housing portion 22, the particle removal device 1 comprises a particle inlet 31 arranged on the process chamber 25. During process operation, particles are supplied to the particle removal device 1 via the particle inlet 31, which are removed from the fluidizing apparatus 11 by means of process gas via the feeding line 7c.

In the conical housing portion 23, the particle removal device 1 comprises a particle discharge 33 arranged in the area 32 of the housing floor 29. Via the particle discharge 32, the particles separated from the process gas PG by the filter 24 during process operation are discharged from the particle removal device 1 and collected in the collection container 19.

Moreover, the housing 21 comprises, in the housing cover 54, a raised manhole 29 that is closed in both the operating and cleaning modes and is provided for inspection purposes, and a clean gas outlet 34 that is connected to the clean gas chamber 26, as shown in an enlarged view of the detailed section D of the particle removal device 1 shown in FIG. 4. Downstream of the clean gas outlet 34, the particle removal device 1 comprises the conveying device 13 designed as a blower 12 for variable setting of the process gas flow. In this regard, the conveying device 13 comprises the conveying unit 12 and the control unit 17, the control unit 17 being designed in the embodiment shown as a control valve 16 comprising a control unit drive device 50. In a not shown embodiment, the control device 17 is realized as a control flap comprising a control unit drive device 50.

The particle removal device 1 also comprises a dry cleaning device 57 for the filter 24 that is cleaned wet. In the embodiment shown, the dry cleaning device 57 is designed as a control valve 59 that has a dry cleaning drive unit 58. In an embodiment not shown, the dry cleaning device 57 is realized as a control flap comprising a dry cleaning drive unit 58.

During process operation, in which the particles P introduced into the particle removal device 1 by means of the process gas PG are separated from the process gas flow by the filter 24, the filter 24 becomes clogged with particles P. This increases the pressure loss at the filter 24 to such an extent that dry or wet cleaning of the filter is necessary to clean the particles P off it.

Dry cleaning is carried out in particular during process operation, in which the control valve 16 is closed and the control valve 59 is opened, so that the filter 24 experiences a pressure surge due to the negative pressure prevailing in the particle removal device 1, which at least partially cleans the particles P clogging the filter 24 from the filter 24. As soon as the dry cleaning has been carried out, the control valve 16 is opened and the control valve 59 is closed and the separation of the particles P from the process gas flow can be continued. Dry cleaning can be performed at any time and with any frequency during process operation. In an embodiment not shown, the dry cleaning device is designed in such a way that compressed air is used for cleaning.

A cleaning operation is an operation of the particle removal device in which the filter is cleaned of particles when the filtration process is interrupted. During the cleaning operation, the control valve 16 and the control valve 59 as well as the particle inlet 31 are preferably closed if possible.

The method for wet-cleaning the particle removal device 1 is performed in the cleaning operation. During this process, the clean gas chamber cleaning nozzle 41 of the clean gas chamber cleaning device 42 sprays a cleaning fluid in the form of a cleaning liquid into the clean gas chamber 26 when the filtration process is interrupted, whereby the particles P adhering to the filter 24 are loosened from the filter 24 and thus the filter 24 is cleaned.

The filter 24 is arranged in an inclined filter plane C-C with respect to the longitudinal axis A-A, i.e. the normal vector 51 to the filter plane C-C comprises an angle 52 to the longitudinal axis A-A, so that the sprayed cleaning liquid, such as water or another solvent, on the filter top 53 in the direction of the cleaning fluid collection area 37 formed in the peripheral area 35 of the filter 24 on the housing wall 28 of the device.

The bypass channel gate valve 46 is moved from the closing position to the opening position before, during or after the cleaning fluid is applied. Preferably, the bypass channel gate valve is moved to the opening position before the cleaning fluid is applied in the cleaning operation, so that the cleaning fluid collecting at the cleaning fluid collection area 37 can flow at least partially through the bypass channel 43 from the clean gas chamber 26 into the process gas chamber 25.

The cleaning fluid is then expediently discharged from the process chamber 25 via the particle discharge 33. In a not illustrated embodiment, the cleaning fluid is discharged from the process chamber 25 via a cleaning fluid discharge device.

After wet cleaning, the filter 24 is dried. To dry the filter 24, an unloaded process gas PG flows through the particle removal device 1, whereby the bypass channel gate valve 46 remains in an opening position, so that the unloaded process gas PG can flow at least partially through the bypass device 44. In this case, the unloaded process gas PG is expediently heated before transfer to the particle removal device 1, so that the cleaning fluid bound in the filter 24 after the wet cleaning evaporates or vaporizes. As the drying process progresses, the bypass channel gate valve 46 is expediently gradually closed until, at the end of the drying process, the bypass channel gate valve 46 is in its closing position.

The invention claimed is:

1. A particle removal device for separating particles from a process gas flow, comprising: a housing comprising a vertically oriented longitudinal axis, a filter subdividing the housing into a process chamber comprising the particles to be separated and a clean gas chamber receiving a dedusted process gas, a particle inlet arranged on the process chamber and a particle discharge arranged on the process chamber, a clean gas outlet arranged in the clean gas chamber, a clean gas chamber cleaning device arranged in the clean gas chamber and having at least one clean gas chamber cleaning nozzle for wet cleaning of the filter, which comprises a filter plane inclined with respect to the longitudinal axis, during the cleaning process, and a bypass device through which a bypass channel passes, wherein the bypass channel comprises a bypass inlet connected to the clean gas chamber and a bypass outlet connected to the process chamber, wherein the bypass device further comprises a bypass channel gate valve that can be selectively positioned in a closed position preventing fluid flow through the bypass channel or in at least one open position allowing fluid flow.

2. The particle removal device according to claim 1, wherein the bypass device comprises a gate valve drive unit associated with the bypass channel gate valve, which brings the bypass channel gate valve from the closed position into an open position and vice versa.

3. The particle removal device according to claim 1, wherein a process chamber cleaning device comprising at least one process chamber cleaning nozzle is arranged in the process chamber.

4. The particle removal device according to claim 3, wherein it is possible to move the at least one process chamber cleaning nozzle radially from the longitudinal axis in the direction of a housing wall and in the opposite direction.

5. The particle removal device according to claim 1, wherein the particle discharge is arranged in the area of a housing floor.

6. The particle removal device according to claim 1, wherein the filter is connected at its peripheral area to an inner surface of the housing wall, so that a cleaning fluid collection area is formed in the peripheral area on the housing wall, which is connected to the bypass inlet.

7. The particle removal device according to claim 6, wherein the cleaning fluid collection area comprises a lowest point and the bypass inlet is connected to the cleaning fluid collection area at the lowest point of the latter.

8. The particle removal device according to claim 1, wherein the particle removal device comprises a conveying device arranged downstream of the clean gas outlet for the variable setting of the process gas flow.

9. The particle removal device according to claim 8, wherein the conveying device comprises a control unit for closed-loop control functionality and a conveying unit.

10. The particle removal device according to claim 9, wherein the control unit is in the form of a control valve comprising a control unit drive device or of a control flap comprising a control unit drive device.

11. The particle removal device according to claim 1, wherein the particle removal device comprises a dry-cleaning device which is suitable for cleaning the filter during process operation.

12. A method for wet-cleaning a particle removal device for separating particles from a process gas flow, with the particle removal device comprising a housing comprising a vertically oriented longitudinal axis, a filter subdividing the housing into a process chamber comprising the particles to be separated and a clean gas chamber receiving a dedusted process gas, a particle inlet arranged on the process chamber and a particle discharge arranged on the process chamber, a clean gas outlet arranged in the clean gas chamber, a clean gas chamber cleaning device arranged in the clean gas chamber and having at least one clean gas chamber cleaning nozzle for wet cleaning of the filter which comprises a filter plane inclined with respect to the longitudinal axis, during the cleaning process, and a bypass device through which a bypass channel passes, wherein the bypass channel comprises a bypass inlet connected to the clean gas chamber and a bypass outlet connected to the process chamber, wherein the bypass device further comprises a bypass channel gate valve that can be selectively positioned in a closed position preventing fluid flow through the bypass channel or in at least one open position allowing fluid flow, the method comprising:

in the cleaning operation, the clean gas chamber cleaning device outputs a cleaning fluid in the form of a cleaning liquid and the bypass channel gate valve is moved from a closed position into an open position so that the cleaning fluid can flow at least partially through the bypass channel from the clean gas chamber into the process gas chamber.

13. The method according to claim 12, wherein the bypass channel gate valve is moved from the closing position into the opening position before, during or after the cleaning fluid is output.

14. The method according to claim 12, wherein the cleaning fluid is discharged from the process chamber via the particle discharge.

15. The method according to claim 12, wherein after the wet cleaning, the filter is dried by an unloaded process gas flowing through the particle removal device, wherein at least at the beginning of the drying process, the bypass channel gate valve remains in an opening position so that the unloaded process gas can at least partially flow through the bypass device.

16. The method according to claim 15, wherein as the drying process progresses, the bypass channel gate valve is gradually closed.

17. The method according to claim 15, wherein the unloaded process gas is heated before flowing through the particle removal device, so that the cleaning fluid retained in the filter after the wet cleaning evaporates or vaporizes.

* * * * *